Patented Nov. 25, 1952

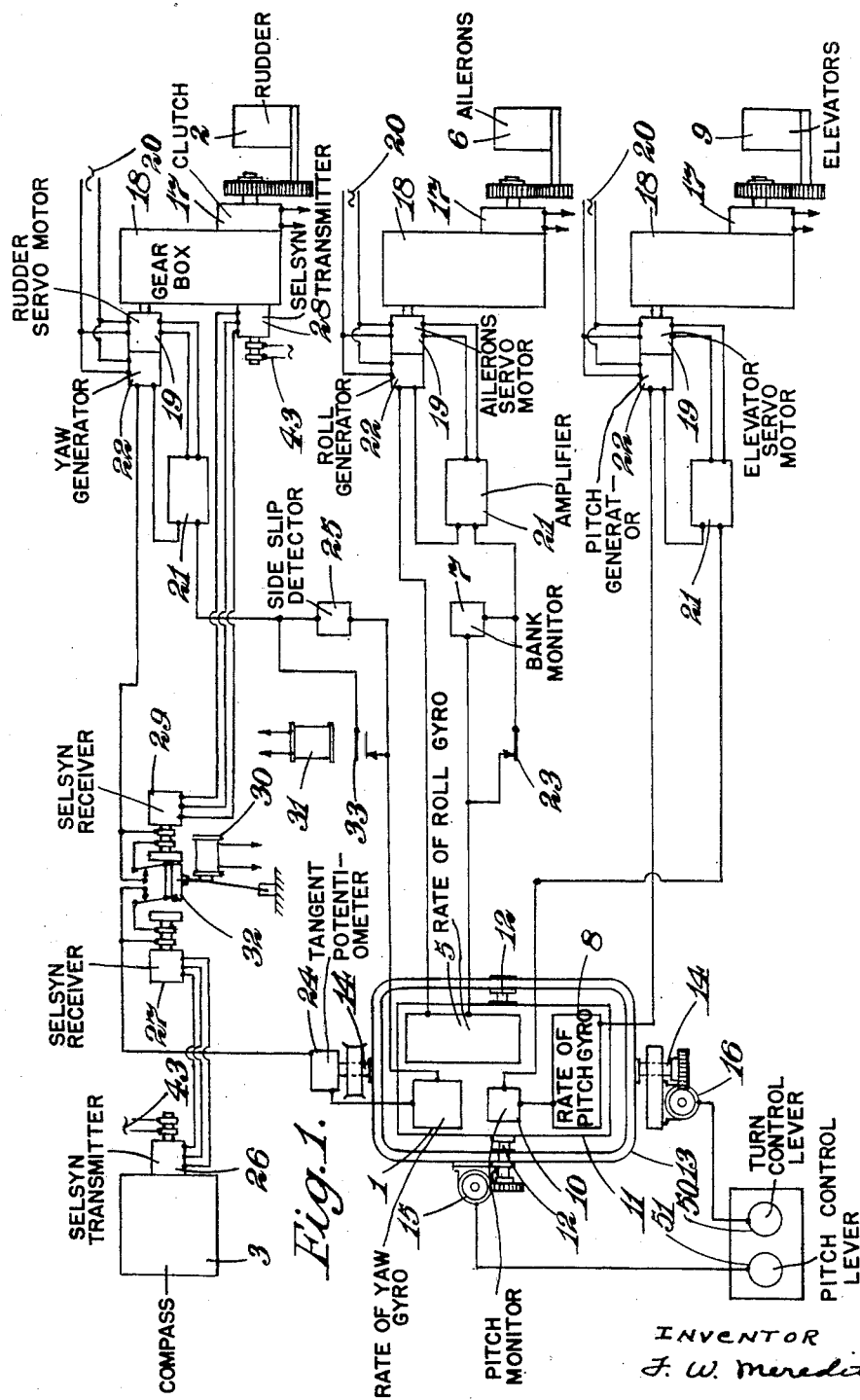

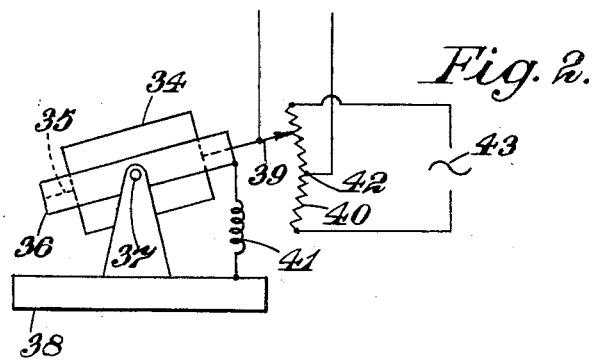
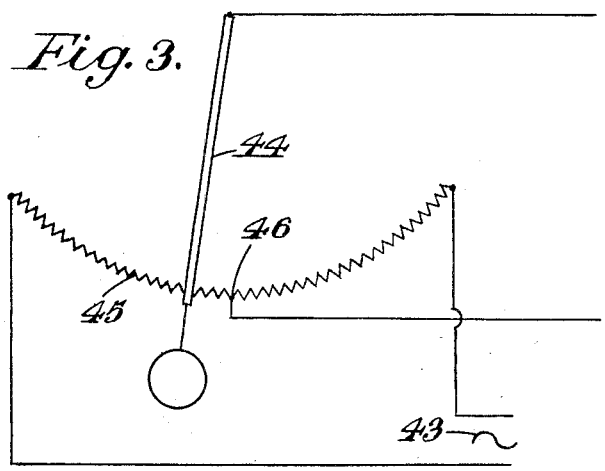
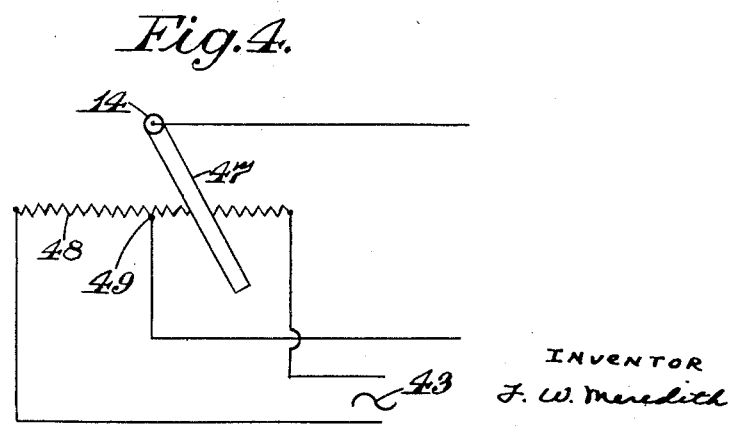

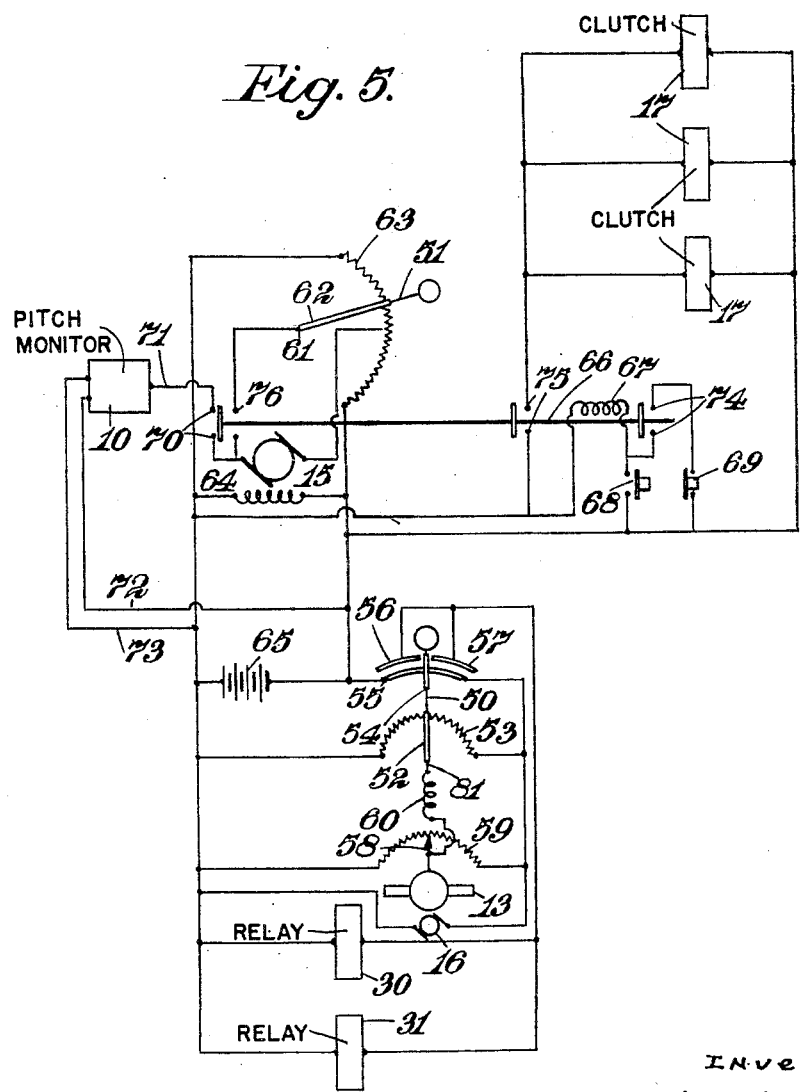

2,619,623

UNITED STATES PATENT OFFICE 2,619,623

AUTOMATIC CONTROL SYSTEM FOR CONTROLLING MOVING CRAFT

Frederick William Meredith, Cricklewood, London, England, assignor to S. Smith & Sons (England) Limited, London, England, a British company Application July 8, 1947, Serial No. 759,625
In Great Britain June 20, 1946

Section 1, Public Law 690, August 8, 1946
Patent expires June 20, 1966

15 Claims. (Cl. 318—489)

1

This invention relates to automatic control systems for controlling moving craft both air and marine about a control axis.

It is usual to control an aircraft about three axes, pitch, roll and yaw, and a marine craft about one, yaw. Furthermore it is known to effect such control by providing a deviation detector to detect a change in attitude of the craft about a control axis from a datum attitude and to operate a valve or a switch controlling a servomotor which operates the appropriate control surface to stabilise the craft and return it to the datum attitude in pitch, roll or yaw as the case may be. In this known arrangement the valve or switch is generally in two parts, one being operated by the detector and the other being mechanically coupled to the servomotor so that the servomotor is operated in accordance with the misalignment between the detector and the servomotor.

With an automatic control system of this type the usual way to change the datum attitude is to displace one of these two parts of the valve or switch in relation to its operating member by an amount corresponding to the desired change of attitude to create a false misalignment, so that the craft changes its attitude until the parts are restored to their initial position.

The object of the present invention is to provide an automatic control system which does not make use of the above mentioned misalignment signal to effect stabilisation (although the misalignment may be used to effect monitoring) and in which nevertheless provision is made for effecting a change of attitude. A further object of the invention is to introduce damping without interfering with any desired change of attitude.

An automatic control system for controlling a moving craft, according to the present invention, comprises a device for measuring rate of turn about a control axis of the craft, means for controlling the attitude of the craft about that axis in accordance with the measured rate of turn to maintain a predetermined attitude and means for effecting a change of attitude at a predetermined rate.

The means for controlilng the attitude of the craft preferably comprises a servomotor operating the appropriate control surface and arranged to operate at a speed proportional to the measured rate of turn.

The means for effecting a change of attitude may comprise means for rotating the device relatively to the aircraft about the said axis. Alternatively where the device generates an E. M. F.

2 proportional to the rate of turn the means for effecting a change of attitude may comprise means for injecting a counter-E. M. F. into the system, whereby the craft changes its attitude at a rate proportional to the injected E. M. F. In this latter arrangement damping may be effected by introducing into the system a further E. M. F. proportional to the differential with respect to time of the magnitude of the difference between the E. M. F. generated by the said device and the said injected E. M. F. so that the further or damping E. M. F. only becomes effective upon departure of the rate of turn from the predetermined rate of turn. It should be noted that if only the E. M. F. generated by the said device is differentiated the damping E. M. F. would delay the initiation of the turn to effect a change of attitude.

The invention will now be described by way of example with reference to the accompanying drawings, of which:

Figure 1 illustrates diagrammatically the layout of an automatic control system for controlling an aircraft about all three axes;

Figure 2 illustrates in further detail the rate-of-turn instruments shown in Figure 1;

Figure 3 illustrates in further detail the pendulums shown in Figure 1;

Figure 4 illustrates in further detail the tangent potentiometer shown in Figure 1;

Figure 5 illustrates in further detail the control circuits shown in Figure 1.

Figure 6:
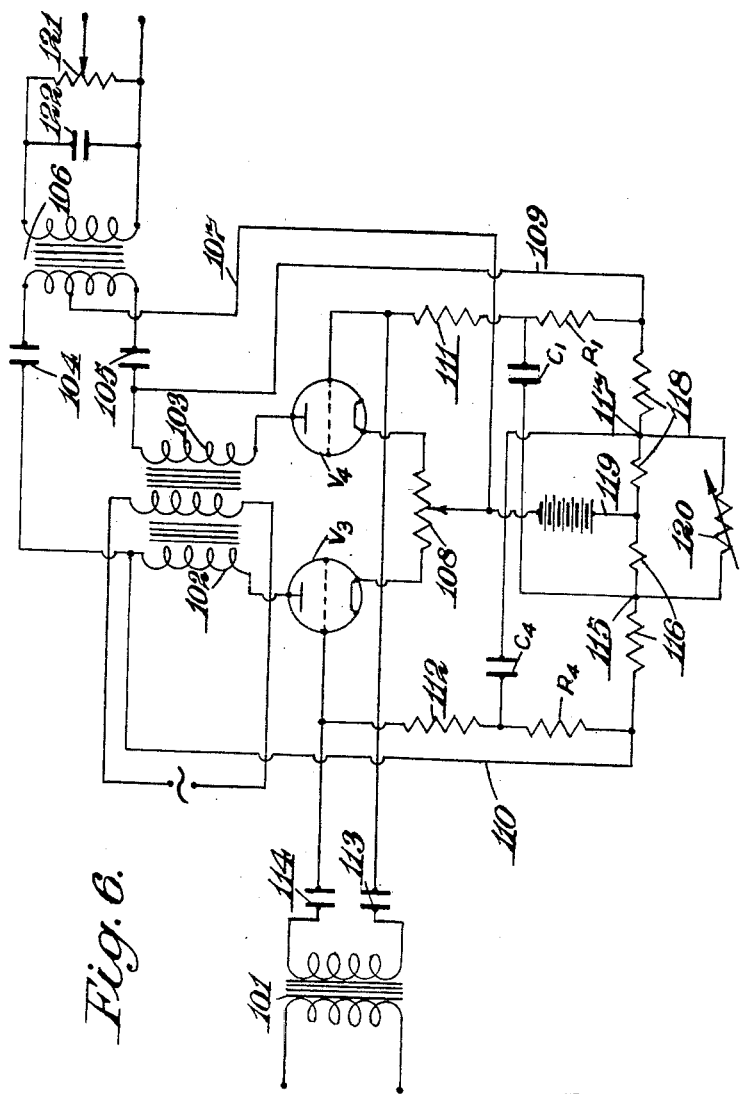
Figure 6 is a diagram of a valve circuit for adding in the differential of the signal in an A. C. signal circuit.

As disclosed in my copending application S. N. 655,684 filed March 20, 1946, an aircraft can be stabilized by three rate-of-turn gyroscopes; in yaw by gyroscope 1 controlling rudder 2, in roll by gyroscope 5 controlling ailerons 6 and in pitch by gyroscope 8 controlling elevators 9. A compass controlled directional gyroscope 3 monitors course during straight flight, pendulum 7 monitors bank and pitch pendulum 10 monitors pitch. Ring 13 pivoted about roll axis 14 gimbals platform 11 about pitch axis 12. Adjustment is made by motors 15 and 16. Hysteresis motors 19, coupled to their respective control surfaces by clutch 17 and gear box 18, have one phase connected to a reference source 20 and the other phase to a control amplifier 21 and a hysteresis generator 22. Contacts 23 shunt bank pendulum 7 on turns. Tangent potentiometer 24 gives a signal of movement of platform 11 in roll. Pendulum 25 detects side-slip. Selsyn transmitters 26 and 28 are supplied by source 43 of the same frequency as source 20 and are connected to Selsyn receivers 27 and 29, respectively, which are associated by relays 30, 31 and brake member 32. Relay 31 controls contacts 33 to introduce side-slip signal from pendulum 25 into the circuit.

A suitable rate-of-turn gyroscope for use as gyroscope 1, 5 or 8 is illustrated diagrammatically in Figure 2. As there shown a gyroscope comprises a rotor 34 mounted on spin axis 35 in a gimbal ring 36 gimbaled about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42.

In operation any turn about an axis normal to the base 38 results in precession of the gyroscope about the axis 37 against the spring restraint to an extent determined by the rate of turn. Hence the output voltage will be proportional to the rate of turn.

It will be appreciated that the rate-of-turn gyroscope described above may be arranged to measure rate of turn about any of the three aircraft axes and that the three gyroscopes may readily be made interchangeable.

As an alternative to the use of gyroscopes in the arrangement described with reference to Figure 1, the rate-of-turn devices described in United States patent application No. 504,072 may be used.

Pendulums 7, 10 and 25 may be constructed as shown in Fig. 3. Pendulum arm 44 traverses arcuate resistance 45 supplied by source 43. The signal is taken from conducting arm 44 and the central tap 46 of resistance 45. Tangent potentiometer 24 shown in Fig. 4 comprises a conducting arm 47 which traverses linear resistance 48 supplied by source 43. The signal is taken from arm 47 and central tap 49 of resistance 48.

Control is effected by turn control lever 50 and pitch control lever 51. Lever 50, pivoted at 81 carries insulated contact strip 52 over arcuate potentiometer resistance 53 and also insulated contact strip 54 in permanent contact with segment 55 and if displaced left, over segment 56 or right, over segment 57. Ring 3 drives contact arm 58 over resistance 59. D. C. motor 16 has field winding 60 connected between strip 52 and arm 58.

Lever 51 pivoted at 61 carries strip 62 over resistance 63. Field 64 of D. C. motor 15 is connected across battery 65. Switch 66 operated by coil 67 and buttons 68 and 69 cuts automatic control in or out. In the deenergized position shown one brush of motor 15 is connected to pendulum 10 through contacts 70 and lead 71. Pendulum 10 may engage either lead 72 or 73 to the terminals of battery 65. Contacts 74 and 75 are closed in response to pressing button 68 to place the automatic control in operation.

The arrangement described above is modified to introduce damping into the rudder control circuit by adding to the other voltages applied to the input of the amplifier 21 a damping voltage proportional to the differential of the algebraic sum of the voltages derived from the rate of yaw gyroscope 1 and the potentiometer 24. For this purpose the algebraic sum of the modulated 400~ voltages derived from the rate of yaw gyroscope 1 and the potentiometer 24 is applied to the input of the circuit shown in Figure 6.

As there shown two triodes $V_1$ and $V_2$, which may conveniently be in one envelope, are circulated so that the modulated 400~ A. C. signal is applied differentially to the two grids through the input transformer 101.

A. C. voltage of the reference frequency (400~) and phase is applied in the same phase (push-push) to the two anodes by secondary windings 102 and 103 on an anode transformer, the primary of which is connected to a suitable voltage source.

The half wave anode pulses are applied through condensers 104 and 105 to the opposite ends of the primary winding of an output transformer 106 the centre tap of this primary winding being connected by a lead 107, which carries the A. C. components of the two valve currents, to the adjustable tap on a cathode balancing resistor 108, the ends of which are connected to the two cathodes of the valves $V_1$ and $V_2$.

The direct current components of the two valve currents are led through leads 109 and 110 to opposite ends of a grid biassing network to which the grids are connected by grid leak resistors 111 and 112, the input circuit being isolated by condensers 113 and 114.

The grid leak 111 is connected through a resistance $R_1$ direct to the lead 109 and, through a condenser $C_1$ to a tapping 115 on a resistance 116 which in series with a resistance 118 joins lead 110 to lead 109.

Similarly the grid leak 112 is connected through a resistance $R_2$ to lead 110 and, through a condenser $C_2$ to a tapping 117 on resistance 118.

The nodal point of the two resistances 116 and 118 is joined by a line 119 to the tapping on the cathode balancing resistance 108. This line carries the entire D. C. component of the two valve currents and may conveniently pass through a source of D. C. potential to offset the negative grid bias produced by the resistance 108 and the resistances 116 and 118.

A variable resistance 120 is connected across the two tappings 115 and 117 whereby the amount of transient regenerative differential bias applied to the grids may be adjusted.

The output transformer secondary feeds a potentiometer 121 and is tuned by the condenser 122. By these means the overall gain factor of the circuit can be adjusted to the required value. The A. C. load in the anode cathode circuits is purely resistive so that the voltage across the output potentiometer 121 is in phase with the valve pulses and therefore with the reference voltage applied to the anode transformer.

The two condensers $C_1$ and $C_2$ are of equal values as are the two resistances $R_1$ and $R_2$.

The circuit operates as follows:

As long as the input signal to transformer 101 is zero and the two grids are equally biassed, balanced half wave pulses are applied to the output transformer 106 and the voltage across the output terminals is also zero.

Again, as long as the two grids are equally biassed, any in phase signal applied to the transformer 101 will unbalance the anode pulses thus leading to an in phase signal at the reference frequency across the output potentiometer.

But differential bias of the two grids will also unbalance the anode pulses so that even in the absence of an input signal, an output signal will appear proportional to the amount of differential bias applied to the grids.

Let $E_1$ be the A. C. signal applied to the input transformer, $E_2$ the output A. C. signal appearing across the tapping of the potentiometer 121, and $E_b$ the differential D. C. bias applied to the grid leak returns.

Then $E_2 = E_1 + kE_b$, the overall gain being so adjusted.

Let $I_1$ and $I_2$ specify the D. C. components of the two valve currents.

Then $E_2 \propto I_1 - I_2$ (where $\propto$ is the proportionality sign).

To simplify the analysis it is assumed that $R_1$ and $R_2$ are large compared with the potential dividers 116 and 118 so that each of these carries substantially the whole demodulated current of its respective valve.

It is assumed as obvious that the effect of varying the resistance 120 is equivalent to varying simultaneously and symmetrically the two potential tapping points 115 and 117 on the potential dividers 116 and 118.

Then referring all D. C. potentials to the line 107 the potential applied to the bottom of $R_2$ is $-R_a I_1$ and the potential applied to the bottom of $R_1$ is $-R_a I_2$, where $R_a$ is the value of each of the resistances 116 and 118.

Again, from considerations of symmetry it may be stated $$I_1 = I_0 + I$$
$$I_2 = I_0 - I$$

so that $$E_2 \propto I_1 - I_2 = 2I$$

and if $E_{T_1}$ is the potential applied to the bottom of resistance $R_2$ $$E_{T_1} = -R_a m (I_0 + I)$$

and if $E_{T_2}$ is the potential applied to the return 117 of $C_2$ $$E_{T_2} = -R_a m (I_0 - I)$$

where $m$ represents the adjustable potential ratio of the tappings 115 and 117.

Then if $E_{B_1}$ be the potential at the return of the grid leak 112

$$E_{B_1} = E_{T_2} + \frac{1}{1 + CRD}(E_{T_1} - E_{T_2})$$

where $D$ represents the differential operator and $R$ and $C$ are the values of $R_1$ and $R_2$ and $C_1$ and $C_2$ respectively.

Thus, writing $t^1$ for $RC$, which has the dimensions of time.

$$E_{B_1} = E_{T_2} + \frac{1}{1 + t^1 D}(E_{T_1} - E_{T_2})$$

Thus $$-E_{B_1} = mR_a I_0 - mR_a I + \frac{1}{1 + t^1 D}((1-m)R_a I_0 + (1+m)R_a I)$$

Similarly the bias applied to grid leak 111 being $$E_{B_2} - E_{B_2} = mR_a I_0 + mR_a I + \frac{1}{1 + t^1 D}((1-m)R_a I_0 - (1+m)R_a I)$$

But the differential bias $E_b = E_{B_1} - E_{B_2}$ so $$E_b = 2R_a I \left( m - \frac{1}{1 + t^1 D}(1 + m) \right)$$

$$= 2R_a I \left( m \frac{t^1 D - 1}{t^1 D + 1} \right)$$

If $g$ represents the mutual conductance of each of the valves and assuming that the function of the resistor 108 is merely to adjust the mutual conductances to equality and to swamp out accidental variations of the mutual conductances at the expense of a resulting low value of $g$, it may be stated.

$$I_1 = \text{const.} + \frac{g}{2}(E_b + aE_1)$$

$$I_2 = \text{const.} - \frac{g}{2}(E_b + aE_1)$$

$$I_2 = \text{const.} - \frac{g}{2}(E_b + aE_1)$$

$$\therefore I = \tfrac{1}{2} g (E_b + aE_1)$$

then $$\left(1 + gR_a \left( \frac{1 - m_1 t^1 D}{1 + t^1 D} \right)\right) I = \frac{agE_1}{2}$$

Since we have shown that $E_2 \propto I$, writing $E_2$ for $bI$ $$\left( \frac{1 + t^1 D + gR_a - gR_a m t^1 D}{1 + t^1 D} \right) E_2 = \frac{abgE_1}{2}$$

or, writing $r$ for $gR_a$ $$\frac{E_2}{E_1} = \frac{abg}{2} \cdot \frac{(1 + t^1 D)}{(1 + r) + t^1 D(1 - mr)}$$

$$= \frac{abg}{2(1+r)} \cdot \frac{(1 + t^1 D)}{1 + t^1 D \frac{(1 - mr)}{1 + r}}$$

Since the overall factor is adjustable to any required value the constant $$\frac{abg}{2(1+r)}$$

may be ignored (while noting that it should be reasonably stable owing to the cathode swamp resistance 108) and therefore $$\frac{E_2}{E_1} = \frac{1 + t^1 D}{1 + \frac{t^1 D}{N}}$$

Where $$N = \frac{1 + r}{1 - mr}$$

and may if desired be adjusted to a very large value by adjustment of $m$ until $mr$ approaches 1, when $$\frac{E_2}{E_1} \text{ approaches } 1 + t^1 D$$

The output $E_2$ is thus applied to the input of the amplifier 21 in the place of that previously derived from the rate of yaw gyroscope 1 and the potentiometer 24.

I claim:

1. An automatic control system for controlling a moving craft comprising a gimbaled platform mounting a device giving a first signal in accordance with rate of turn of the craft about a control axis, an amplifier, a servomotor controlled by the output of said amplifier and actuating a control surface controlling the craft about the said control axis, means giving a second signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said axis, and means connected to said platform to rotate said platform and to change the course of the craft about said axis at a predetermined rate.

2. An automatic control system for controlling a moving craft comprising a gimbaled platform having thereon a device giving a first signal in accordance with rate of turn of the craft about a control axis, an amplifier, a servomotor controlled by the output of said amplifier and actuating a control surface controlling the craft about said control axis, means giving a second signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said control axis and means connected to said platform to rotate said platform and the rate of turn device about the control axis relative to the craft at a predetermined rate to cause the craft to rotate about the control axis in the opposite direction to that of the rotation of said rate of turn device and at the predetermined rate in such a manner that the control surface operates to rotate the craft at a rate equal and opposite to that at which said platform is rotated whereby said platform will be level in space when its rotation ceases and the craft will have been turned through the angle through which the platform rotated.

3. An automatic control system for controlling a moving craft comprising a gimbaled rotatable platform mounting a device giving a first signal in accordance with the rate of turn of the craft about a control axis, an amplifier, a servomotor controlled by the output of said amplifier and actuating a control surface controlling the craft about said control axis, means giving a second signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said axis and means to inject a third signal into the amplifier input equal and opposite to the said first signal when the craft is turning about the control axis at a predetermined rate to cause the craft to turn about the said control axis at the said predetermined rate in such a manner that the control surface operates to rotate the craft at a rate equal and opposite to that at which said platform is rotated whereby said platform will be level in space when its rotation ceases and the craft will have turned through the same angle as the platform.

4. An automatic control system for controlling a moving craft comprising a device giving a first electric signal in accordance with rate of turn of the craft about a control axis an electric amplifier, a servomotor controlled by the output of said amplifier and actuating a control surface controlling the craft about said control axis, a tachometric electric signal generator giving a second signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said axis and means to change the course of the craft by rotation of the craft about said axis at a predetermined rate.

5. An automatic control system for controlling a moving craft comprising a device giving a first electric signal in accordance with rate of turn of the craft about a control axis, an electric amplifier, a servomotor controlled by the output of said amplifier and actuating a control surface controlling the craft about said control axis, a tachometric electric signal generator giving a second electric signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said axis and means to rotate the rate of turn device relative to the aircraft about the control axis at a predetermined rate to cause the aircraft to turn about the said control axis in the opposite direction at the same predetermined rate.

6. An automatic control system for controlling a moving craft comprising a device giving a first electric signal in accordance with rate of turn of the craft about a control axis, an electric amplifier, a servomotor controlled by the output of said amplifier and actuating a control surface controlling the craft about said control axis, a tachometric electric signal generator giving a second electric signal in accordance with the rate of movement of said control surface, means to apply the first and second signals in opposition to the input of the amplifier to cause the control surface to be actuated at a rate substantially proportional to the rate of turn of the craft about the control axis to stabilise the craft about said axis, and means to inject a third electric signal into the amplifier input equal and opposite to the said first signal when the craft is turning about the control axis at a predetermined rate to cause the craft to turn about the said control axis at the said predetermined rate.

7. An automatic control system for controlling a moving craft comprising a device giving a first electric signal in accordance with rate of turn of the craft about a control axis, an electric amplifier, a servomotor controlled by the output of said amplifier and actuating a control surface controlling the craft about said control axis, a tachometric electric signal generator giving a second electric signal in accordance with the rate of movement of the control surface, means to apply the first and second electric signals in opposition to the input of the amplifier to cause the control surface to be actuated at a rate substantially proportional to the rate of turn of the craft about the control axis to stabilise the craft about said axis, means to inject a third electric signal into the amplifier input equal and opposite to the said first signal when the craft is turning about the control axis at a predetermined rate to cause the craft to turn about the said control axis at the said predetermined rate, means to generate a fourth electric signal in accordance with the rate of change with respect to time of the difference between the aforesaid first and third signals and means to apply the said fourth signal to the amplifier input to improve the damping of the system.

8. An automatic control system according to claim 7 wherein the means to generate the fourth electric signal comprise a further amplifier to the input of which is applied the difference between the first and third signals together with a part of the further amplifier output, fed back degeneratively through an integrating circuit to the input of said further amplifier.

9. An automatic control system according to claim 7 wherein the means to generate the fourth electric signal comprise a pair of grid-controlled amplifier valves to the control grids of which the difference between the first and third signals is applied in push-pull and similar integrating circuits are connected between anode and grid of each valve to feed back the integral of the output of each valve degeneratively to the input.

10. An automatic control system according to claim 7 wherein the signals are amplitude-modulated A. C. signals and the means to generate the fourth electric signal comprise a pair of grid-controlled amplifier valves to the control grids of which the difference between the first and third signals is applied in push-pull and there are applied respectively to the anodes of the valves two A. C. voltages in phase and of equal amplitude, said voltages being in phase with the voltage on the grid of one valve and in anti-phase with that on the other, whereby the valves pass pulses of direct current and the difference between the direct currents through the valves is in accordance with the input signal, two similar resistors and two similar condensers, one resistor being connected between anode and grid of each valve and one condenser being connected between grid and cathode of each valve to feed-back degeneratively to each grid a direct voltage in accordance with the integral of the current through the valve and a transformer whose primary is connected between the anodes of the two valves and across whose secondary is developed the fourth signal, said fourth signal being an A. C. signal substantially in accordance with the rate of change of the difference of the first and third signals.

11. In combination an automatic control system for controlling a movable craft comprising a device for generating an electromotive force proportional to the rate of turn about a control axis of the craft, means for controlling the attitude of the craft about said axis in accordance with said electromotive force to maintain a predetermined attitude, means for injecting a counterelectromotive force into the said system to effect change of attitude at a rate proportional to the injected counterelectromotive force and means for introducing into the system a third electromotive force for damping the system proportional to the differential with respect to time of the electromotive force generated by said device and the said injected counterelectromotive force so that third or damping electromotive force only becomes effective upon departure of the rate of turn from the predetermined rate of turn, said means for introducing said third electromotive force comprising an amplifier, means for applying to the input of said amplifier the electromotive force generated by said device and the said injected counterelectromotive force and means for feeding a part of the amplified output through an integrating circuit back to the input degeneratively.

12. An automatic control system as claimed in claim 11 wherein the means for introducing the said damping E. M. F. into the circuit comprises two grid controlled valves to the control grids of which the alegbraic sum of the input E. M. F.'s is applied in push-pull and feed back paths connecting the anode of each valve to the control grid of the same valve through an integrating circuit.

13. An automatic control system as claimed in claim 12 wherein the said feed back paths comprise means for generating a voltage proportional to the difference in the currents flowing through the valves, means for applying said voltage to an integrating circuit and means for applying the voltage resulting from such integration differentially to the grids of said valves.

14. An automatic control system as claimed in claim 13 in which the said E. M. F.'s are A. C. at a reference frequency and in which the said amplifier comprises two grid-controlled valves to the grids of which the input E. M. F.'s are applied in push-pull and to the anodes of which an A. C. voltage of reference frequency is applied in push-push, a first resistance connecting the anode circuit to the control grid of one of the valves, a second resistance connecting the anode circuit to the cathode of one of the valves, similar resistances connecting the anode circuit to the control grid and cathode of the other valve, and two condensers each of which is connected between a tapping point on the first resistance of one of the valves and a tapping point on the second resistance of the other valve.

15. An automatic control system as claimed in claim 11 in which the said E. M. F.'s are A. C. at a reference frequency and are applied in push pull through coupling condensers to two control grids of a pair of valves which are independently forced to pulse in push-push at the reference frequency, means of separating the direct current and alternating components of the anode pulses, means of applying the alternating components in push-pull to the means for controlling the attitude of the craft, means for applying differential bias to the control grids and means for controlling said differential bias degeneratively with delay in accordance with the difference of the direct current components of the two valves.

FREDERICK WILLIAM MEREDITH.

REFERENCES CITED

The following references are of record in the file of this patent:

UNITED STATES PATENTS

| Number | Name | Date |
| --- | --- | --- |
| 1,703,280 | Minorski | Feb. 26, 1929 |
| 2,401,168 | Kronenberger | May 28, 1946 |
| 2,415,430 | Frische et al. | Feb. 11, 1947 |
| 2,415,819 | Halpert et al. | Feb. 18, 1947 |